United States Patent [19]

Meyerson et al.

[11] Patent Number: 4,647,494
[45] Date of Patent: Mar. 3, 1987

[54] SILICON/CARBON PROTECTION OF METALLIC MAGNETIC STRUCTURES

[75] Inventors: Bernard S. Meyerson; Rajiv V. Joshi, both of Yorktown Heights; Robert Rosenberg, Peekskill; Vishnubhai V. Patel, Yorktown Heights, all of N.Y.

[73] Assignee: International Business Machines Corporation, Armonk, N.Y.

[21] Appl. No.: 793,517

[22] Filed: Oct. 31, 1985

[51] Int. Cl.$^4$ .............................................. G11B 5/72
[52] U.S. Cl. ...................................... 428/216; 427/39; 427/40; 427/41; 427/131; 428/336; 428/408; 428/426; 428/446; 428/694; 428/695; 428/900; 428/698
[58] Field of Search ............... 428/694, 698, 695, 900, 428/446, 408, 215, 216, 336, 426; 427/131, 41, 39, 40; 360/134–136

[56] References Cited

U.S. PATENT DOCUMENTS

| | | | |
|---|---|---|---|
| 4,376,963 | 3/1983 | Knoop | 427/131 |
| 4,411,963 | 10/1983 | Aine | 428/900 |
| 4,503,125 | 3/1985 | Nelson | 428/408 |
| 4,554,217 | 11/1985 | Grimm | 428/694 |

FOREIGN PATENT DOCUMENTS 0034143  4/1981  Japan .................................. 427/131

*Primary Examiner*—Ellis P. Robinson
*Attorney, Agent, or Firm*—Jackson E. Stanland

[57] ABSTRACT

A superior wear-resistant coating is provided for metallic magnetic recording layers, where the improved coating is a hard carbon layer that is strongly bound to the underlying metallic magnetic recording layer by an intermediate layer of silicon. The silicon layer can be very thin, with a minimum thickness of a few atomic layers, and provides strong adhesion between the hard carbon protective layer and the metallic magnetic recording layer. A preferred technique for depositing both the intermediate silicon layer and the hard carbon layer is plasma deposition, since both of these depositions can be performed in the same reactor without breaking vacuum.

19 Claims, 1 Drawing Figure

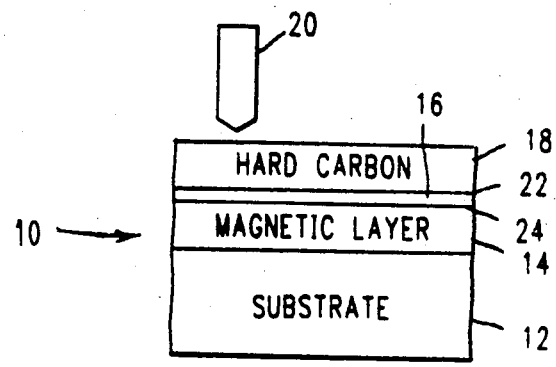

SILICON/CARBON PROTECTION OF METALLIC MAGNETIC STRUCTURES

DESCRIPTION

1. Technical Field

This invention relates to metallic magnetic recording media, and in particular to such media and methods wherein an improved adherent, wear-resistant coating is provided on a metallic magnetic recording layer.

2. Background Art

Magnetic recording media are well known in the art, and include tapes, disks, drums, and other forms which are used for the storage of information. These recording media are generall comprised of a magnetic coating material deposited upon a permanent substrate. The magnetic coating material usually consists of a binder having ferromagnetic materials therein, or a metallic layer comprised of a magnetic material. An example of a magnetic recording medium comprised of a metallic magnetic layer is a hard disk having a substrate of aluminum or silicon and a magnetic metallic coating thereon, which can be an alloy such as GdCo, CoPtCr, CrV-CoPtCr, etc.

These various forms of magnetic recording media are used in combination with magnetic recording heads or transducers to produce read, write, and erase functions. As the technology has developed, the thickness of the magnetic metallic layer has decreased and higher density recording has been the general direction, in order to increase the total number of bits which can be stored on the magnetic recording medium. However, this trend to higher density recording also requires that the recording heads be brought closer and closer to physical contact with the metallic magnetic recording layer. Very often, this results in "crashing" of the recording head into the magnetic recording medium. This crashing effect causes wear on the magnetic metallic layer and on the surface of the magnetic recording head. Often the debris caused by such a crash will stick to the recording head and affect it's aerodynamic properties and its electrical properties. Further, if the metallic magnetic layer is physically displaced at the location of the head crash, the information stored at that location will be destroyed.

In order to prevent these problems, it is known in the art to provide a protective coating layer on the magnetic recording layer, or to make the magnetic recording layer abrasion-resistant by incorporating hard particles in the magnetic recording layer. For example, an article by C. A. Bruce et al, in the IBM Technical Disclosure Bulletin, Vol. 21, No. 4, page 1634, September 1978, describes a hard protective overlayer on a magnetic recording layer, where the recording layer can be comprised of either a ferromagnetic powder dispersed in a binder or a magnetic metallic film. The protective overlayer is comprised of wear-resistant nonmagnetic particles of alumina, silicon carbide, diamond, etc., dispersed in an organic binder.

The aforementioned Bruce et al article also describes the other approach to providing protection of a magnetic recording layer, i.e., the incorporation of particles into the magnetic recording layer to make it more abrasion-resistant. These particles are hard, nonmagnetic particles of approximately 100 angstroms diameter which appear in the upper-most layer of the recording media.

Two other references describing the use of additives in the magnetic recording layer for protection against abrasion include U.S. Pat. Nos. 4,275,115 and RE. 28866. Both of these patents describe magnetic recording layers comprising particulates in a binder, where the particulates include both magnetic particles and nonmagnetic particles. The nonmagnetic particles in the binder have a specified diameter and hardness in order to protect against abrasion and damage to the recording layer during head crashes.

Whereas technology has addressed the problem of protection of the magnetic recording layer, the effectiveness of the solutions which have heretofore been provided is limited. As the magnetic recording density increases and as the thickness of the magnetic recording layer decreases, the constraints on protection become severe. In particular, this problem is even more pronounced when thin metallic magnetic layers are used as the recording layers. These magnetic alloys don't lend themselves to the incorporation of nonmagnetic particulates therein, and it is very difficult to provide very hard but very thin protective layers which will adhere well to the metallic magnetic layers. Still further, it is difficult to provide an atomically smooth protective layer, rather than the nonuniform, rough surface protective layers which result when particulates are added to an organic binder. As is apparent to those of skill in the art, the provision of an atomically smooth surface on a very thin protective layer will allow the recording head to be positioned extremely close to the metallic magnetic recording layer and will minimize the likelihood of head crashes.

Accordingly, it is a primary object of the present invention to provide an improved very thin and extremely hard protective layer on a metallic magnetic recording layer.

It is another object of this invention to provide an improved magnetic recording structure and method for making the same in which a very thin, hard protective layer is located on a metallic magnetic recording layer, where the adhesion between the protective layer and the metallic magnetic layer is excellent.

It is another object of the present invention to provide an improved protective layer on a metallic magnetic recording layer.

It is another object to provide an improved protective layer on a metallic magnetic recording layer, wherein the protective layer will not cause abrasion of a magnetic recording head even if it is in contact with the magnetic recording head.

It is another object of this invention to provide an improved protective layer on a metallic recording layer, where the protective layer is easy to fabricate and is very uniform in composition and thickness.

It is another object to provide an improved protective layer for a metallic magnetic recording layer, where the protective layer has superior wear characteristics and can be used to protect any composition of metallic magnetic recording media.

It is another object of the present invention to provide an improved protective layer on a metallic magnetic recording layer, where the protective layer can be produced with an atomically smooth surface.

DISCLOSURE OF THE INVENTION

Improved wear-resistant coatings are provided for metallic magnetic recording layers, where the protective layer is comprised of hard carbon which adheres very well to the metallic magnetic layer. To ensure adherence between the hard carbon protective layer and the metallic magnetic layer, an interface layer of silicon is used. The silicon layer adheres very well to the underlying metallic magnetic layer, and can form metal silicides with this magnetic layer. The hard carbon layer adheres wel to the silicon layer, and forms an interfacial layer of silicon-carbon bonds. It is not the intent of this invention to form a silicon carbide layer (which is known as a wear-resistant material), but rather to provide a hard carbon layer having good adhesion to the magnetic substrate, due to the silicon layer.

Generally, the silicon layer is about a monolayer—500 angstroms in thickness. It is only important that, after the silicon bonds to the metallic metal layer, that a continuous layer of silicon be available for bonding to the overlying hard carbon layer. Only a monolayer of continuous silicon is required for this purpose, as silicon and carbon can form Si-C bonds at room temperature. Thus, the silicon layer can be extremely thin and still provide strong adhesion to both the underlying metallic layer and the overlying hard carbon protective layer. This means that the recording head can be extremely close to the metallic magnetic recording layer, as is required in high density magnetic recording systems.

The composite protective layer is comprised of silicon-Si/C bonds/hard carbon, although it is feasible to have all of the silicon used in the formation of silicides with the underlying metallic magnetic layer and Si/C bonds with the overlying hard carbon layer.

This protective layer is atomically smooth on its top surface and provides excellent protective properties against abrasion.

Although hard carbon films are known as protective layers (K. Enke, Thin Solid Films, 80, p. 227, 1981), these carbon films will not adhere to metallic magnetic recording layers. However, in the practice of this invention, it has been discovered that hard carbon layers which are themselves very desirable for their mechanical properties can be used as protective layers for metallic magnetic recording if an intermediate layer of silicon is used to provide the necessary adhesion between the underlying magnetic recording layer and the overlying hard carbon protective layer.

In a preferred embodiment, both the silicon interfacial layer and the hard carbon protective layer are produced by plasma deposition in a single chamber, providing extreme ease of fabrication and fabrication reliability.

These and other objects, features, and advantages will be apparent from the following more particular description of the preferred embodiments.

BRIEF DESCRIPTION OF THE DRAWINGS

The FIGURE shows a structure representative of a magnetic recording medium including a metallic magnetic recording layer located on a substrate, and a composite protective layer comprised of a silicon interfacial layer and an overlying hard carbon protective layer. This type of layered structure can be incorporated into disks, tapes, cards, etc.

BEST MODE FOR CARRYING OUT THE INVENTION

The FIGURE illustrates a recording structure of the type used in magnetic recording disks, tapes, cards, etc. In general, the structure 10 is comprised of a substrate 12, a metallic magnetic recording layer 14, an interfacial layer 16 of silicon, and a hard carbon protective layer 18. The hard carbon layer 18 and the interfacial layer 16 provide a strongly-adherent, wear-resistant coating without unduly increasing the separation between the recording head 20 and the metallic magnetic recording layer 14.

The specific compositions used for the substrate 12 and the metallic magnetic recording layer 14 can be varied, and include the types of materials generally known for these uses. For example, when hard magnetic recording disks are to be formed, the substrate 12 is typically glass, polymers, epoxies, ceramics, aluminum, or silicon. The metallic magnetic layer 14 is comprised of a thin film of a magnetic material or alloy, such as GdCo, CoPtCr, and CrV-CoPtCr, etc. The nature of the substrate 12 and the metallic magnetic recording layer 14 is not critical to the invention, and other materials can be used as long as the magnetic recording layer 14 is comprised of a metallic film.

In the practice of this invention, hard carbon layers 18 are used as protective coatings over the metallic magnetic layer 14, and are made strongly adherent to the recording layer 14 by the use of an intermediate layer 16. This intermediate layer is silicon, which will form strong bonds with the underlying metallic magnetic layer 14 and with the overlying hard carbon layer 16. Silicon layer 16 serves as a nucleation layer, and its thickness is only such that a good bond will be formed to the underlying metallic layer 14 while leaving a continuous film of silicon for bonding to the overlying hard carbon layer 18. For the purpose of bonding to the hard carbon layer 18, only a few monolayers (that is, a layer a few atoms thick) is required, as long as the thin silicon layer is continuous. When the carbon layer 18 is thereafter deposited, very strong Si-C bonds will result, and silicon carbides may form at the interface 22 between the silicon layer 16 and the carbon layer 18. Similarly, the interface 24 between silicon layer 16 and the metallic magnetic layer 14 may be comprised of metal silicides, such as PtSi and CrSi, where the phase of the metal silicide that is formed depends upon the deposition temperature (substrate temperature). For example, Pt silicide can form at 280° C., while Cr silicides can form at 500° C.

The silicon interfacial layer 16 can be deposited by any known technique, such as evaporation, sputtering, or plasma deposition. Of these, plasma deposition is preferred since, with tha technique, the same processing equipment and steps can be used to form the overlying hard carbon layer 18. In this manner, both the silicon layer 16 and the carbon layer 18 can be formed by plasma deposition without the requirement to break the vacuum in the system. The only steps to be undertaken are to change the source gasses from, for example, silane, to acetylene ($C_2H_2$). The plasma is comprised of hydrogen and the decomposition of mixtures of acetylene and hydrogen occurs by using an RF plasma. In order that the hard carbon films retain their amorphous nature and not become graphitic (i.e., soft), the substrate temperature for plasma deposition of carbon layer 18 should be below 325° C. The plasma deposition temperature for the silicon layer 16 is not critical, and can range from room temperature to, for example, 350° C.

In one example an amorphous silicon film, a-Si, was deposited by plasma deposition from a gas mixture of 1% silane ($SiH_4$) in argon, at a flow rate of 25 sccm (standard cubic centimeters per minute), a total pressure of 125 microns, and 5 W RF power. The substrates were kept at a bias of −150 VDC during the deposition of a-Si.

It has been noted that the thickness of the deposited silicon layer 16 is not critical, as this layer is used as a nucleation, or interface, layer. Typically, silicon is deposited to a thickness of about 10–50 angstroms, although a possible range is from a monolayer to about 500 angstroms.

If silicon layer 16 is too thick, the recording density of the metallic magnetic layer 14 has to be decreased to ensure that write and read operations can be adequately performed. This is opposite to the desired direction of the technology and therefore is unacceptable. However, it will be understood that the principle of the present invention—the provision of a strongly adherent and very protective layer—will still be present even though the thickness of the silicon layer is more than the required minimum. In the circumstance of an overly thick silicon layer, the lower 20 angstroms or so of the silicon layer will strongly bond to the underlying metallic magnetic layer, while the upper-most 20 angstroms or so of the silicon layer will form Si-C bonds with the overlying carbon layer 18.

As was noted, the hard carbon layer 18 is preferrably deposited by plasma decomposition of a gas mixture, since this can be accomplished in the same vacuum system as the plasma deposition of silicon layer 16. However, a hard carbon layer can be deposited by other methods, such as sputtering. The thickness of the hard carbon layer 18 is usually about 250 angstroms, although its thickness can range from about 25 angstroms to about 1 micron. If the hard carbon film 18 has a thickness in excess of about 1 micron, adverse stresses usually develop. Further, in order to provide high recording density, it is desirable to keep the carbon layer 18 as thin as possible while still retaining the necessary wear-resistant qualities: atomic smoothness, ease of fabrication, and reproducibility. Carbon film 18 is an amorphous film which must be continuous in order to provide the necessary protective properties.

The following example will illustrate the practice of the present invention to provide a strongly adherent and wear-resistant protective layer. First, amorphous silicon films have been deposited from a gas mixture of 1% silane in argon, at a flow rate of 25 sccm. A total pressure of 125 microns was used, and 5 W of rf power were applied. During the deposition of amorphous silicon onto substrates comprised of metallic magnetic layers, the substrates were at a bias of −150 Vdc. The metallic magnetic layers were magnetic alloys of CoPtCr and CrV-CoPtCr. Approximately 5–25 angstroms of silicon were deposited in this manner.

In the same vacuum system, the source gas was changed from silane in argon to acetylene ($C_2H_2$). A 13.56 MHz rf plasma was used, where the plasma was produced by capacitive discharge between two parallel plates 3 inches in diameter, having 1 inch spacing between the plates. Prior to carbon deposition, the silicon substrates were etched for 30 seconds in a 10% HF solution for removal of any surface oxide layer. The substrates were then exposed for 45 minutes to a hydrogen plasma in order to provide both reactive and sputtered cleaning of the growth surface and also a further reduction of the native oxide layer on the silicon substrates.

The rf power was set at 5 watts (corresponding to a surface power density of 110 mW.cm$^{-2}$). The total pressure was held constant at 30 microns, with a total gas flow set at 6 sccm. The substrate electrode was kept at a negative DC bias of 150 VDC during deposition. Initial deposition runs were performed at a lower substrate bias of −70 VDC, but it was found that the adhesion of the carbon films to the substrates was better at the higher bias value. At substrate biases higher than this, arcing will occur in the reactor which will produce plasmas that are not stable.

At substrate temperatures above about 325° C., the carbon films will become graphitic and will soften significantly. For this reason, the substrate temperatures are kept below 325° C., in order that a hard carbon layer will be deposited, which is required in order to provide the necessary protection of the underyling metallic layer.

Both adhesion tests and wear testing were performed on the deposited hard carbon films. These tests indicated the superior protective value of the hard carbon layer when it is deposited on a silicon interface layer. In the absence of the silicon interface layer, there was poor adherence of the hard carbon film and the value of the protective carbon layer was lost.

Transmission electron microscopy (TEM) was used to study the nature of the hard carbon films. These tests indicated an amorphous microcrystalline structure with crystallite sizes smaller than 50 angstroms. Although a slightly higher degree of crystallinity may have been present in these films, the mean crystallite size was below 50 angstroms. The tests also revealed some preferential orientation of the microcrystallites with the c-axis normal to the plane of the film, although this orientation effect was not total. Microdiffraction pattern analysis for hard carbon films formed on Si (111) and Si (100) did not reveal different microdiffraction patterns, indicating that the crystallographic orientation of the substrate did not affect the microstructure of the hard carbon films.

Precleaning of the silicon substrates similar to plasma deposition of the hard carbon layer will provide better adherence between the silicon layer 16 and the carbon layer 18. Studies revealed the presence of $SiO_2$ at the carbon/silicon interface for carbon films deposited on silicon substrates which were not pre-etched in HF. Thus, the hydrogen plasma preclean does not, by itself, completely remove the native oxide from the silicon substrate.

As noted previously, some slight microcrystallinity was indicated by the TEM analysis. However, the results of x-ray diffractometry (XRD), x-ray photoemission spectroscopy (XPS), and TEM all indicate that the carbon films are essentially amorphous with some slight microcrystallinity. As the substrate bias is increased up to about 2 kV, a higher degree of crystallinity will occur. In the present examples, the substrate bias was 70–180 V, which provided highly amorphous carbon films. At higher substrate bias, the higher energy of the accelerated ions impinging upon the biased substrate will cause local crystallization in depositing carbon films.

Because the carbon films are obtained using a hydrogen plasma in the foregoing examples, some hydrogen incorporation into the carbon films will occur. Experiments show that there is a gradual increase in the hydrogen content at the beginning of the deposition of the carbon layer 18, i.e., from the carbon film/substrate interface. Only after about 300 angstroms is the bulk concentration obtained. Generally, as the carbon film increases in thickness there will be a gradual decrease of the surface bias on the growing dielectric carbon film. This causes a corresponding increase in hydrogen concentration with decreasing bias. Of course, a gradual build-up of hydrogen may occur in the reactor from cracking of acetylene. Experiments have indicated a decrease in hydrogen content in the carbon films as the substrate temperature is increased. All of these carbon films provided very good protection layers.

As noted previously, very adherent films have been produced in accordance with this invention. Experiments indicated that the carbon films deposited on the silicon substrates have very good adhesion, which is independent of the substrate temperature during deposition. The adhesion force between the hard carbon layer 18 and the silicon layer 16 is higher than the cohesion of silicon to the undelying metallic magnetic layer 14. Fractures which occurred during pull tests occurred in the silicon substrate. In the absence of the silicon interface layer, hard carbon films have no adhesion to the underlying metallic magnetic layer, and this situation is independent of the deposition temperature. In the experiments wherein no interface layer 16 was used, the carbon films did not have good adhesion and had high internal stresses. These carbon films cracked and had a pottery appearance, and were films which could be easily wiped off the underlying magnetic layer.

In further adhesion tests, amorphous silicon layers deposited on metallic magnetic substrates at room temperature broke at the silicon-metal interface. However, for amorphous silicon films deposited at substrate temperatures of 250° C., the fracture occurred in the silicon substrate, indicating tha the amorphous silicon/magnetic metallayer adhesive bond is stronger in this case than the cohesive strength of the silicon substrate. This led to addition tests of amorphous silicon films deposited at 250° C. as adhesion layers between the hard carbon layer 18 and the metallic layer 14. In one test, a 400 angstrom thick hard carbon layer 18 was deposited onto an amorphous silicon layer of about 50 angstroms thickness. In this test, the fracture during adhesion tests occurred either in the silicon substrate or between the metallic layer and the silicon substrate, or in the metallic layer, indicating that the hard carbon/amorphous silicon/metallic magnetic layer adhesive bond is stronger than the other bonds in the system.

Further tests have indicated that a deposited silicon layer 16 of only a few atomic layers is able to provide extremely good adhesion of the hard carbon film 18 to the surface of the metallic layer 14. Adhesion tests indicate better adhesion to silicon layers of only a few atomic layers thickness as contrasted to that with thicker silicon intermediate layers. In order to deposit an amorphous silicon layer only a few angstroms thick as an intermediate adhesion layer, the silane plasma was applied for approximately 5–10 second, prior to the deposition of the carbon film 18. The main reason for the change in adhesion when thick silicon intermediate layers are used is most probably due to the formation of a larger amount of silicides between the deposited silicon layer and the underlying metallic magnetic layer.

Wear behavior was studied for metallic magnetic recording media protected in accordance with the principle of the present invention. It was found that, although the protective layer may deform during a head crash, the underlying metallic magnetic layer was not damaged, and there was no damage to the recording head.

In the practice of this invention, a superior protective coating is provided on the metallic magnetic recording layer, where the improved protective coating is comprised of a hard carbon layer deposited on a silicon layer located between the hard carbon layer and the underlying metallic magnetic layer. Plasma deposition is a preferred technique for producing this highly protective, strongly-adherent layer.

Although it is understood that those having skill in the art can incorporate variations in the method and structure described hereinabove, it will also be apparent that such variations are within the context and scope of the present invention.

Having thus described our invention, what we claim as new and desire to secure by Letters Patent is:

1. A magnetic recording medium, including:
   a substrate,
   a metallic magnetic recording layer on said substrate, said metallic layer being capable of storing information therein,
   a protective coating for said metallic magnetic layer including a first continuous layer comprised of silicon deposited on said metallic magnetic recording layer, said silicon layer being deposited to a thickness less than 500 angstroms, and a nongraphitic hard carbon layer deposited on said silicon layer, said carbon layer having a thickness of about 25 angstroms—1 micron.

2. The recording medium of claim 1, wherein said first layer comprised of silicon is a continuous film having a thickness of at least a few atomic layers.

3. The recording medium of claim 1, where said first layer comprised of silicon is deposited as a substantially amorphous silicon layer having a thickness less than about 100 angstroms.

4. The recording medium of claim 3, where said hard carbon layer is deposited as a substantially amorphous layer of carbon.

5. The recording medium of claim 1, where said hard carbon layer is comprised of substantially amorphous carbon.

6. The recording medium of claim 1, where said metallic magnetic layer is an alloy including magnetic metallic elements.

7. The recording medium of claim 1, where said hard carbon layer has an atomicaly smooth surface.

8. The recording medium of claim 1, where said substrate is selected from the group consisting of Al, Si, ceramics, epoxies, glass, and polymers.

9. The recording medium of claim 1, where said first layer comprised of silicon forms silicides at the interface with said metallic magnetic layer and Si-C bonds at the interface with said hard carbon layer.

10. A magnetic recording medium, including:
    a metallic magnetic recording layer on said substrate, said metallic layer being capable of storing information therein,
    a protective coating for said metallic magnetic layer comprising amorphous continuous silicon plasma-deposited on said metallic magnetic layer to a thickness less than 500 angstroms and nongraphitic amorphous hard carbon plasma-deposited on said amorphous silicon, said hard carbon having a thickness less than about 1 micron.

11. The recording medium of claim 10, where said amorphous silicon is plasma-deposited to a thickness of at least a few atomic layers and said amorphous carbon is plasma-deposited to a thickness of at least about 25 angstroms.

12. The recording medium of claim 10, where said substrate is selected from the group consisting of Al, Si, epoxies, ceramics, paper, glass, and polymers.

13. The recording medium of claim 10, where said amorphous hard carbon has an atomically smooth surface.

14. The recording medium of claim 10, where said amorphous silicon forms silicides at the interface with said metallic magnetic layer and forms Si-C bonds at the interface with said amorphous hard carbon.

15. A method for producing a metallic magnetic recording medium comprising the steps of:
depositing a metallic magnetic recording layer on a substrate, said metallic recording layer being capable of storing information therin,
depositing a continuous layer of silicon to a depth less than about 100 angstroms on said metallic magnetic recording layer by plasma deposition in a reactor, said plasma deposition decomposing a gas including a gas source of silicon, and
plasma depositing a layer of nongraphitic hard carbon to a thickness less than about one micron on said deposited silicon layer, said plasma deposition of carbon occurring in said reactor by the introduction of a gaseous species including carbon into said reactor while maintaining substantially the same vacuum level in said reactor.

16. The method of claim 15, where said silicon is deposited at amorphous silicon to a depth of at least a few atomic layers, and said carbon is deposited as amorphous carbon to a thickness of at least about 25 angstroms.

17. The method of claim 16, where said substrate is selected from the group consisting of Al, Si, epoxies, paper, glass, polymers, and ceramics.

18. The method of claim 16, where the plasma deposition of said amorphous carbon is at a temperature less than about 325° C., and said amorphous silicon is deposited at a temperature less than about 400° C.

19. The method of claim 16, where said amorphous silicon and amorphous carbon are deposited at room temperature.

* * * * *